United States Patent [19]

Inoue et al.

[11] Patent Number: 5,710,627

[45] Date of Patent: Jan. 20, 1998

[54] WAVELENGTH-SCANNING MECHANISM AND METHOD FOR SPECTROMETER

[75] Inventors: Masaru Inoue; Juichiro Ukon, both of Miyanohigashi-machi, Japan

[73] Assignee: Horiba Ltd., Kyoto, Japan

[21] Appl. No.: 457,267

[22] Filed: Jun. 1, 1995

[30] Foreign Application Priority Data

Jun. 4, 1994 [JP] Japan ................................. 6-145344

[51] Int. Cl.$^6$ ................................. G01J 3/28; G01J 3/18
[52] U.S. Cl. ................................. 356/328; 356/334
[58] Field of Search ................................. 356/326, 328, 356/330–334

[56] References Cited

U.S. PATENT DOCUMENTS 5,268,737 12/1993 Fukuma et al. .......................... 356/334

FOREIGN PATENT DOCUMENTS

| 0054824 | 4/1982 | Japan | 356/334 |
|---|---|---|---|
| 0070415 | 4/1982 | Japan | 356/334 |
| 2047423 | 11/1980 | United Kingdom | 356/334 |

Primary Examiner—K. Hantis
Attorney, Agent, or Firm—Poms Smith Lande & Rose

[57] ABSTRACT

A wavelength-scanning mechanism for a spectrometer utilizes an eccentric disc cam driven by a pulse motor to pivot a diffraction grating with a contact bar fixed thereto. A light source supplies light to the mechanism with a first concave spherical mirror reflecting light to the diffraction grating and reflecting light reflected by the diffraction grating to a zero-order light detector. A second concave spherical mirror reflects light diffracted by the diffraction grating to a diffracted light detector. A controller receives information from the light detectors and controls the pulse motor. At least one cam follower is mounted on the cam at a position eccentric from the rotational axis thereof and slidably contacts the contact bar. Alternatively, the diffraction grating has two contact bars fixed thereto, and the cam follower is pivoted between the contact bars. A method of utilizing the mechanism first determines a center value of zero-order light reflected by the diffraction grating by pivoting the diffraction grating in steps between the time zero-order light is detected until it is no longer detected. The number of steps is divided by two, which yields the center value. Diffracted light is detected at the center value, and the spectral intensity of the detected diffracted light is calculated.

15 Claims, 5 Drawing Sheets

WAVELENGTH-SCANNING MECHANISM AND METHOD FOR SPECTROMETER

BACKGROUND OF THE INVENTION

1. Field of the Invention

The present invention relates to a wavelength-scanning mechanism and method for a spectrometer suitable for multivariate analysis, and more particularly to a wavelength-scanning mechanism and method capable of repeatedly scanning a determined wavelength range for use in monitoring the concentration of chemical solutions.

2. Description of Prior Art

Conventionally, either a sine-bar mechanism in which wavelengths have linear characteristics or a cam mechanism in which wavelengths or wavenumbers are linear has been adopted in the so-called Czerny-Turner-arrangement spectrometer (dispersion-type spectrometer).

A sine-bar mechanism is shown in FIG. 8. A contact bar 14 is fixedly mounted on a rotatable diffraction grating G. A nut N is threaded onto a screw shaft S which is rotated by means of a pulse motor 18 to change a turning angle of the diffraction grating G, such that the sine value of this turning angle of the diffraction grating G is proportional to the wavelength. One drawback of this mechanism is that a highly accurate feed screw mechanism is required, which is not only expensive but limited in long-term and repeated use, such that it may not always be suitable in, for example, a multivariate analysis in which an determined wavelength range is repeatedly scanned.

A cam mechanism is shown in FIG. 9. A contact bar 14 is fixedly mounted on a rotatable diffraction grating G and contacts a cam C rotated by means of a pulse motor 18. Although this mechanism can be endlessly used and is effective in repeated scannability, the accuracy of the cam C bears directly on spectral accuracy, such that it is difficult to produce cams having a complex curve surface without employing much labor and time, increasing cost.

SUMMARY OF THE INVENTION

The present invention was achieved in view of the above-described prior art. Accordingly, it is an object of the present invention to provide a wavelength-scanning mechanism and method for a spectrometer which is superior in repeated scannability within a determined wavelength range and which is inexpensive.

One exemplary embodiment of the wavelength-scanning mechanism according to the invention generally comprises a light source, an incident slit for making light from the light source incident, a rotatable diffraction grating for diffracting light which has passed through the incident slit, a diffracted light-emitting slit for emitting diffracted light, a diffracted light detector for detecting the diffracted light which has passed through the diffracted light-emitting slit, an eccentric disc cam brought into sliding contact with a swinging end of a contact bar fixedly mounted on the diffraction grating at a base portion thereof, and a pulse motor for rotating said eccentric disc cam.

Another exemplary embodiment of the wavelength-scanning mechanism of the invention comprises a light source, an incident slit for making light from the light source incident, a first concave spherical mirror for reflecting light which has passed through the incident slit, a rotatable diffraction grating for diffracting light reflected by the first spherical mirror, a zero-order light-emitting slit for emitting light which has been reflected and collected by the first spherical mirror followed by being specular reflected by means of the diffraction grating, a zero-order light detector for detecting a zero-order light emitted from the zero-order light-emitting slit, a second concave spherical mirror for reflecting diffracted light diffracted by the diffraction grating, a diffracted light-emitting slit for emitting the diffracted light reflected and collected by the second concave spherical mirror, a diffracted light detector for detecting the diffracted light which has passed through the diffracted light-emitting slit, a contact bar fixedly mounted on the diffraction grating at a base portion thereof, an eccentric disc cam brought into sliding contact with a swinging end of the contact bar, a pulse motor for rotating the eccentric disc cam, and a controller for controlling driving the pulse motor in accordance with a control program required for scanning wavelengths.

A further exemplary embodiment is characterized in that the eccentric disc cam of the wavelength-scanning mechanism outlined above comprises a cam follower provided at a position eccentric from a rotation axis of a body of revolution, which is rotated by a pulse motor, with the cam follower being brought into sliding contact with the swinging end of the contact bar, which is fixedly mounted on the diffraction grating at a base portion thereof.

Still a further exemplary embodiment is characterized in that the eccentric disc cam of the wavelength-scanning mechanism for a spectrometer set forth above comprises a part of cam followers provided at positions eccentric from a rotational axis of a body of revolution by different distances. The cam followers are alternatively brought into sliding contact with the swinging end of the contact bar fixed to the diffraction grating.

Yet a further alternative embodiment of the invention as set forth above is characterized in that a plurality of contact bars are fixedly mounted at different angles on the diffraction grating of the wavelength-scanning mechanism for a spectrometer. A cam follower variably set in position is pivoted at a position eccentric from a rotational axis of a body of revolution so as to be selectively brought into sliding contact with the swinging end of any one of the contact bars.

A method for utilizing the wavelength-scanning mechanism of the invention is characterized in that a center value of a spectral range of zero-order light is determined by detecting zero-order light, pivoting the diffraction grating in steps until zero-order light is no longer detected, counting the number of steps therebetween, and dividing the number of steps by two. The diffraction grating is then pivoted to the center value of the spectral range, and light diffracted by the diffraction grating is detected. The detected diffracted light is digitized by an analog- to-digital converter. The spectral intensity of the detected diffracted light is calculated. Diffracted light is continued to be detected until a desired number of data are collected.

These and other embodiments will become apparent to one skilled in the art from the following description with reference to the accompanying drawings.

DETAILED DESCRIPTION OF THE PREFERRED EMBODIMENTS

Exemplary embodiments of a wavelength-scanning mechanism for a spectrometer according to the present invention will be described below in detail with reference to the drawings.

Figure 1:
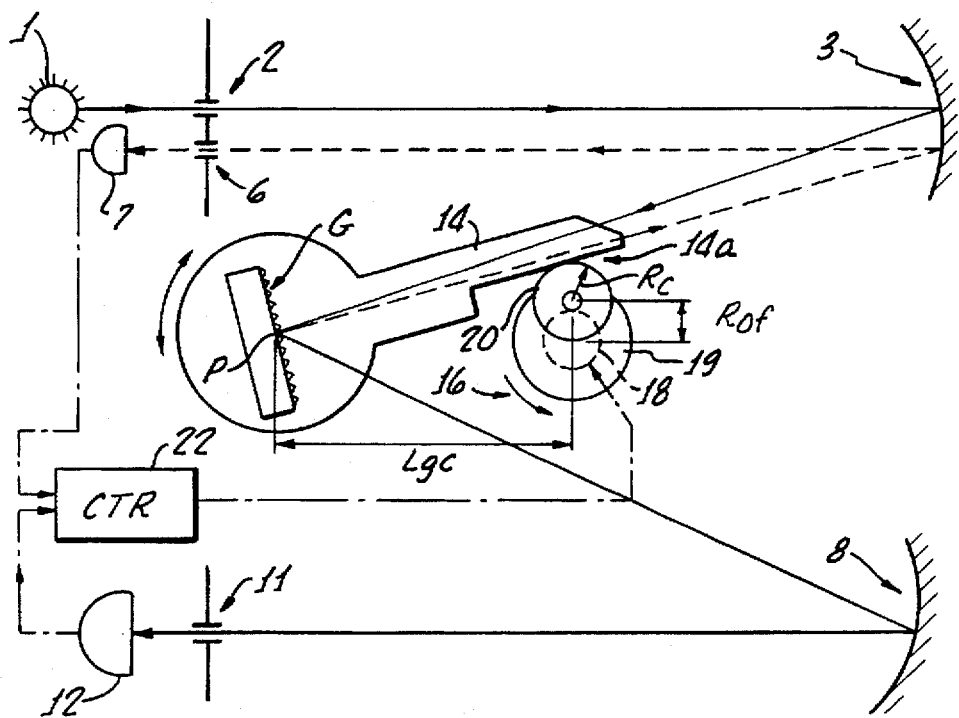
FIG. 1 is a plan view of an exemplary embodiment of a wavelength-scanning mechanism for a spectrometer according to the present invention.

Referring to FIG. 1, a light source, designated by reference numeral 1, emits light through an incident slit 2 to a first concave spherical mirror 3. The light reflects off the first mirror 3 to a rotatable or pivotal diffraction grating G with an axis P for diffracting the reflected light. A zero-order light-emitting slit 6 permits light (shown by the broken line) which has been reflected and collected by the first concave spherical mirror 3 and which has been specularly reflected by the diffraction grating G to pass therethrough to a zero-order light detector 7 which detects zero-order light emitted from the zero-order light-emitting slit 6. A second concave spherical mirror 8 reflects light (a main spectral beam of light rays) diffracted by the diffraction grating G to a diffracted light-emitting slit 11 for emitting the diffracted light reflected and collected by the second concave spherical mirror 8 to a diffracted light detector 12 which detects the diffracted light which has passed through the diffracted light-emitting slit 11.

A contact bar 14 is fixedly mounted on the diffraction grating G at a base portion of the contact bar 14. An eccentric disc cam 16 has a cam follower 20 disposed at a position eccentric from a rotational axis of a body of revolution (eccentric disc) 19 and is rotated by a pulse motor 18. The cam follower 20 is in sliding contact with a swinging end 14a of the contact bar 14 such that the disc cam 16 actuates or rotates the diffraction granting G.

A controller 22 is coupled to the zero-order light detector 7 and to the diffracted light detector 12 at an input side thereof, and is also coupled to the pulse motor 18 at an output side thereof for controlling the scanning wavelengths.

With such a construction, the light which has passed through the incident slit 2 and has been reflected by the first concave spherical mirror 3 is turned into a collimated flux of light rays which is incident upon the diffraction grating G. The diffraction grating G is rotated about axis P which represents a center to reflect specularly the light reflected by the first concave spherical mirror 3 so as to be incident upon the zero-order light detector 7 through the zero-order light-emitting slit 6. Further, the diffracted light reflected by the second concave spherical mirror 8 passes through the diffracted light-emitting slit 11 to be incident upon the diffracted light detector 12 in the form of light having a special wavelength.

In an eccentric cam mechanism, the cam follower 20 having a radius $R_c$ is rotatably provided at a position eccentric from the rotational axis of the body of revolution 19 by a radius $R_{of}$ and the body of revolution 19 is provided at a position apart from the diffraction grating G by a distance $L_{gc}$. The body of revolution 19 is rotated in the direction shown by the arrow by the pulse motor 18. In addition, the body of revolution 19 may be a disc or other form.

Figure 4:
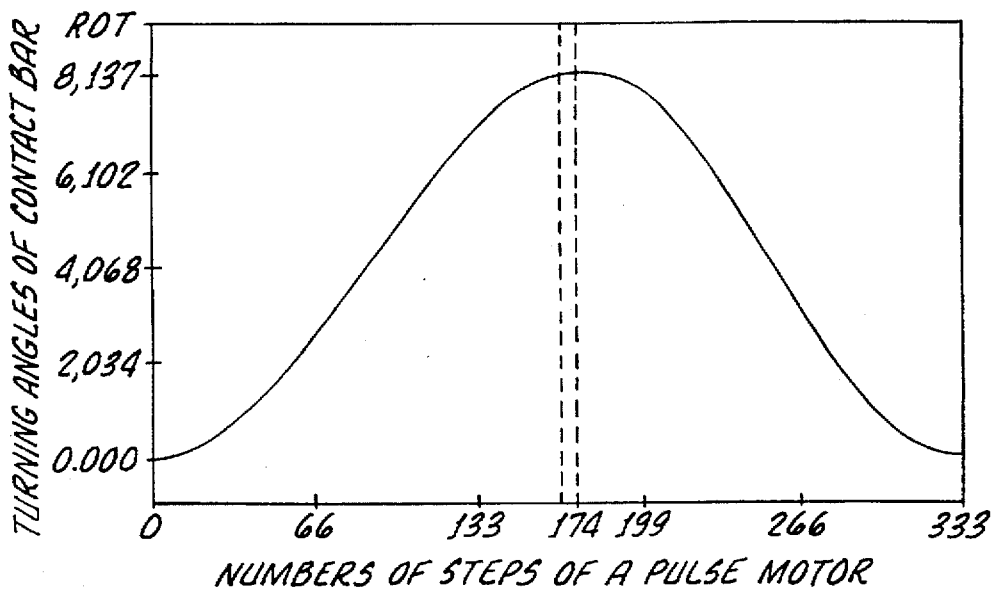
FIG. 4 is a graph illustrating turning angles of a contact bar versus the number of steps of a pulse motor.

At this time, the contact bar 14 is in contact with the cam follower 20 which is reciprocally rotated one time during one revolution (zero to 333 steps) of the body of revolution 19, as shown in FIG. 4, to rotate the diffraction grating G by the same angle, which effectively changes a spectral wavelength. A turning angle ROT is determined by the distance $L_{gc}$ between the center of the diffraction grating G and the center of the eccentric disc cam 16, the eccentric radius $R_{of}$ and the radius $R_c$ of the cam follower 20. The turning angle (the number of steps) of the body of revolution 19 may be reduced and converted to continuous reciprocal motion. Consequently, the eccentric cam mechanism is suitable for repeatedly scanning wavelengths within a determined narrow spectral range. In addition, referring to FIG. 4, the peak of the turning angle ROT of the contact bar 14 is slightly shifted to a higher number of steps, such that the position of the axial center of the cam follower 20 is shifted and the horizontal position at which the cam follower 20 is brought into sliding contact with the contact bar 14 is shifted.

Figure 2:
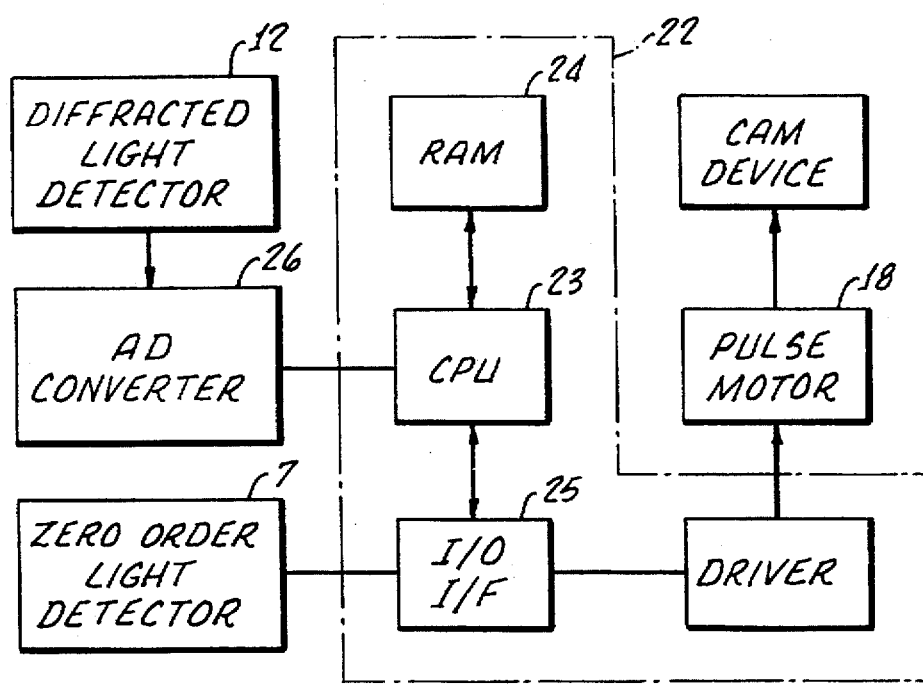
FIG. 2 is a block diagram of a control mechanism of the wavelength-scanning mechanism according to the present invention.
Figure 3:
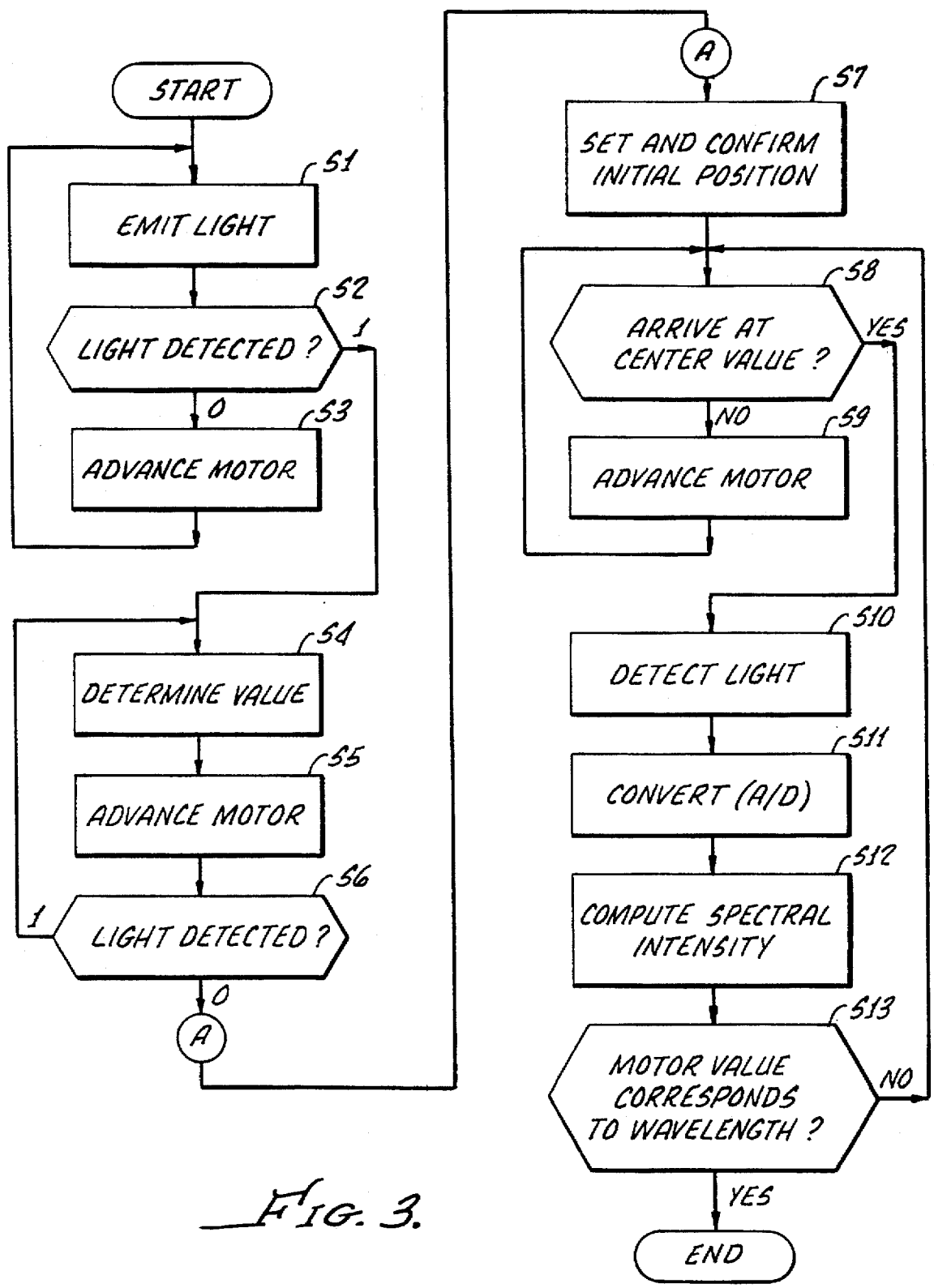
FIG. 3 is a flow chart illustrating a fundamental control flow for scanning wavelengths.

FIG. 2 shows a control mechanism for the controller 22, and FIG. 3 shows a fundamental control flow chart for the continuous and repeated scanning of wavelengths. A method of scanning wavelengths will be described below with reference to FIGS. 1 to 3.

The light source 1 is activated. The zero-order light emitted from the zero-order light-emitting slit 6 is detected by the zero-order light detector 7 which sends a detected signal (0-1 signal) to the computing means (e.g., a CPU) 23 through an input-output interface (I/O I/F) as indicated by step S1. A center value of the counting of the pulse motor 18 is then determined at a time when the zero-order light is detected, as indicated by step S2, and at a time when the zero-order light is impossible to detect, as indicated by step S6. An initial position of the diffraction grating G is then set and confirmed at step S7.

The pulse motor 18 is advanced until the counting of the pulse motor 18 arrives at a determined center value corresponding to a spectral measurement-starting wavelength previously set in a RAM 24, which is followed by detecting the diffracted light emitted from the diffracted light-emitting slit 11 by the diffracted light detector 12, shown by step S10. The diffracted light is subsequently subjected to an analog-digital converter 26 and the CPU 23, shown by step S11, which is followed by computing spectral intensity.

The scanning of wavelengths and the computing of spectral intensity are repeatedly conducted in turn until the determined value of the pulse motor 18 corresponds to the following wavelength to be measured, which is read out from the RAM 24 and set in the CPU 23, shown by step S12, thereby completing a desired number of data to be taken in steps S8 to S13. In addition, setting the following determined value in the above-described step S12 can be conducted by known means such as a reference table (LUT).

As above described, the scanning can be repeatedly conducted within the determined wavelength range by means of the wavelength-scanning mechanism using the eccentric disc cam 16 without requiring inverse rotation of the pulse motor 18; thus, control can be remarkably simplified in content. In addition, by the provision of the cam follower 20, a particularly high accuracy is not required for true circularity of the body of revolution 19, such that the eccentric disc cam 16 can be provided inexpensively as compared with the conventional sine-bar-type and cam-type discs. Furthermore, by using the eccentric disc cam 16, a rough division, which is difficult in the case where the pulse motor is directly driven, can be eliminated and a minute division can be achieved. In particular, the contact bar 14 can be effectively prevented from being eccentrically worn by giving the circumference of the cam follower 20 a centrally convex spherical shape.

As described, the cost of the wavelength-scanning mechanisms for a spectrometer according to the present invention can be reduced by using the easily manufacturable eccentric disc cam. The wavelengths being within the determined range are able to be repeatedly and continuously scanned by rotating the eccentric disc cam in one direction by the pulse motor, which is easily controlled. Thus, the wavelength-scanning mechanisms are suitable for multivariate analysis of, for example, a spectrometer for exclusive use in monitoring the concentration of a chemical solution or the like. In addition, the provision of the cam mechanism allows a fine division as compared with the division in the case where the pulse motor is directly driven.

Figure 5:
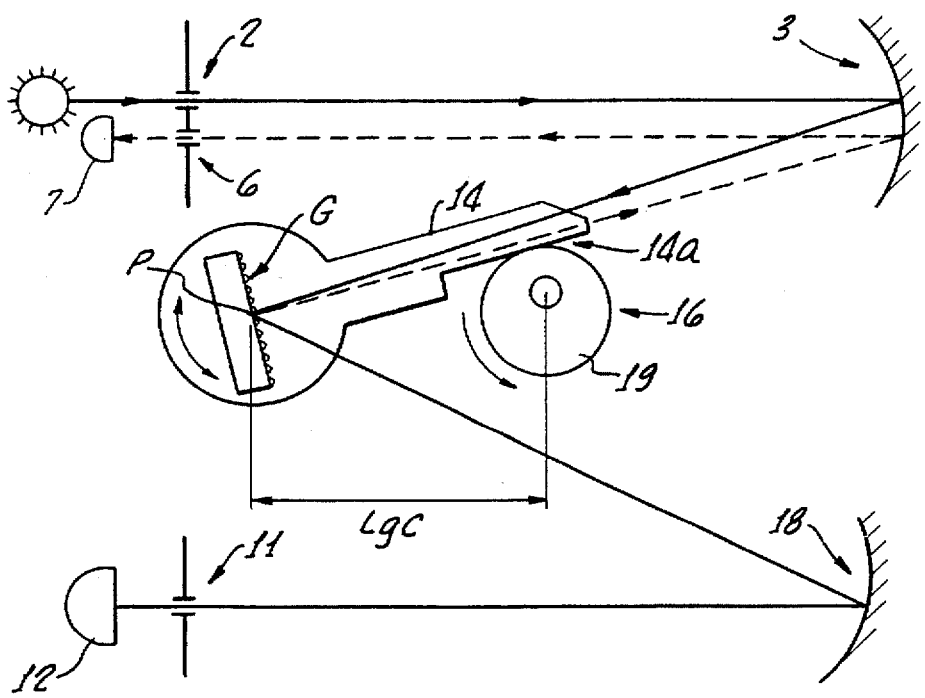
FIG. 5 is a plan view of another exemplary embodiment of a wavelength-scanning mechanism for a spectrometer according to the present invention.

FIG. 5 shows another exemplary embodiment in which a simple eccentric disc cam 16 is obtained by forming the body of revolution 19 in the form of a true circle made eccentric by offsetting the axis of rotation and not adopting a cam follower. In this case, now only is the eccentric disc cam 16 easily manufactured, but the cost is also reduced. According to this embodiment of the invention, the cam follower is used as the eccentric disc cam, so that the eccentric disc cam can be smoothly brought into sliding contact with the contact bar and can be thus prevented from being eccentrically worn. In addition, true circularity is not required for the eccentric disc, such that the eccentric disc can be easily manufactured, thus reducing costs.

Figure 6:
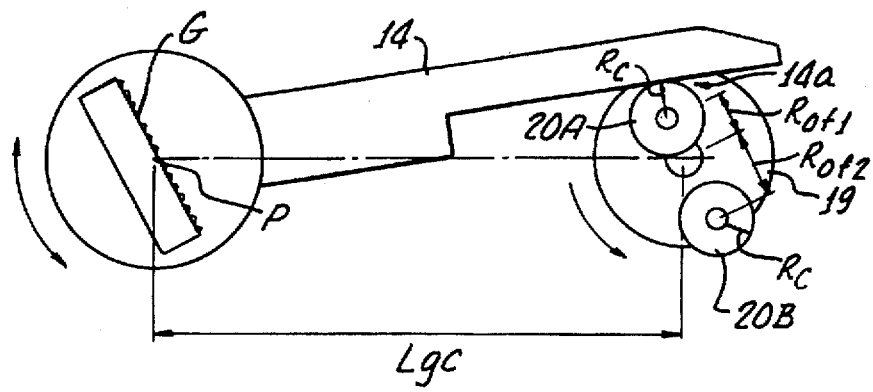
FIG. 6 is a block diagram of still another exemplary embodiment of a wavelength-scanning mechanism for a spectrometer according to the present invention.

FIG. 6 shows still another exemplary embodiment in which a pair of cam followers 20A, 20B are disposed at positions eccentric to the rotation axis of the body of revolution 19 by different distances $R_{of1}$, $R_{of2}$. The respective cam followers 20A, 20B are brought into sliding contact with the swinging end 14a of the contact bar 14 fixedly mounted on the diffraction grating G. In this case, two-stage scanning comprises fine scanning within a narrow range and rough scanning within a wide range conducted during one revolution of the body of revolution 19. According to this embodiment, the swinging end of the contact bar is adapted to be brought into contact with the cam followers provided at the different positions with eccentric distances, such that two-step scanning comprises fine scanning within a narrow range and rough scanning within a wide range during one revolution of the eccentric disc cam.

Figure 7A:
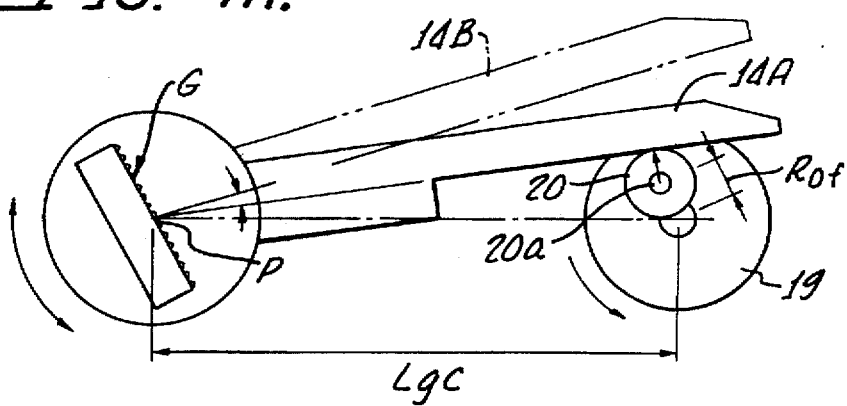
FIG. 7A is a plan view of yet another exemplary embodiment of a wavelength-scanning mechanism for a spectrometer according to the present invention.
Figure 7B:
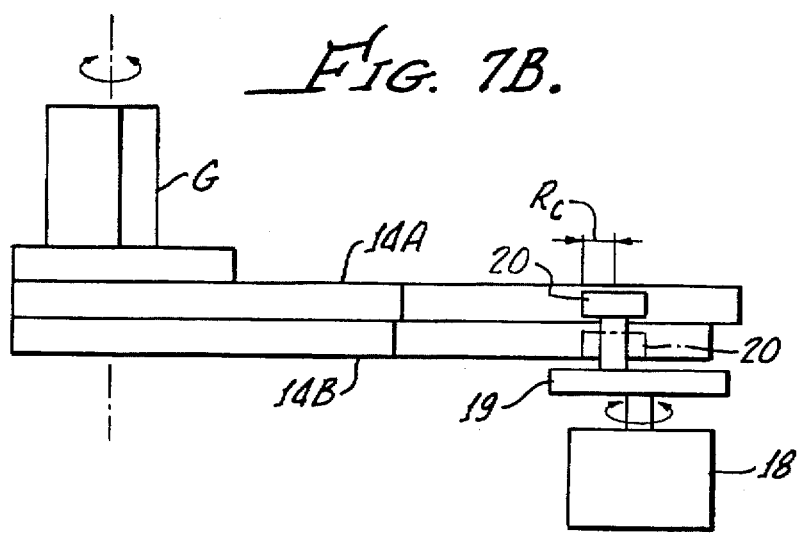
FIG. 7B is a side view of the wavelength-scanning mechanism of FIG. 7A.
Figure 8:
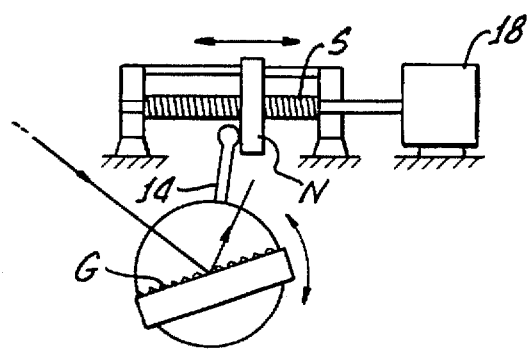
FIG. 8 is a plan view of a conventional sine-bar-type wavelength-scanning mechanism for a spectrometer.
Figure 9:
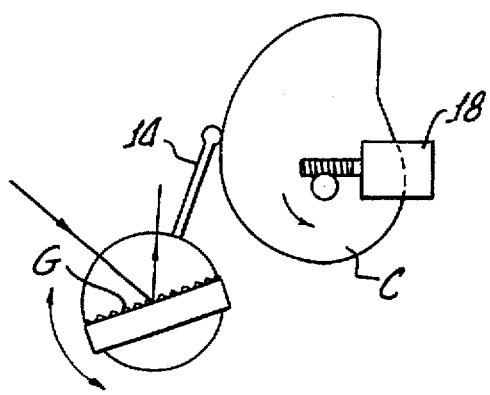
FIG. 9 is a plan view of a conventional cam-type wavelength-scanning mechanism for a spectrometer.

FIGS. 7A and 7B show a still further exemplary embodiment of the invention in which two contact bars 14A, 14B are fixedly mounted on the diffraction grating G at different fitting angles. The cam follower 20 is variably pivoted and set between two positions in the direction of a supporting axis thereof. The cam follower 20 is selectively brought into sliding contact with a swinging end of either of the contact bars 14A, 14B. In this embodiment, scanning is accomplished within two wavelength ranges offset by a wavelength corresponding to the angle between the contact bars 14A, 14B. According to this embodiment of the invention, the cam follower is variably set in position and selectively brought into sliding contact with a plurality of contact bars mounted on the diffraction grating G at the different fitting angles, such that two wavelength ranges corresponding to the different fitting angles of the contact bar can be scanned.

It is naturally possible also to scan the different wavelength ranges at the different scanning roughnesses, respectively, by the means having the construction shown in FIG. 6 and the construction shown in FIG. 7.

Referring to FIGS. 1 and 6, in the embodiments of the wavelength-scanning mechanism for a spectrometer according to the present invention shown in these figures, after the first detection and computation of the diffracted light are completed, the following determined value is set to scan repeatedly. The diffracted light having the wavelength for the determined value previously set is detected and computed until the desired number of data to be taken is completed, so that the multivariate analysis can be efficiently conducted.

In the foregoing disclosure exemplary embodiments of the present invention are described in detail. However, the wavelength-scanning mechanism is capable of various modifications in structure and operation by one skilled in the art without departing from the inventive concept disclosed herein, a number of such modifications having already been described above. Therefore, it is to be understood that the invention is capable of use in various other combinations within the scope of the following claims.

What is claimed is:

1. A wavelength-scanning mechanism comprising:
    a light source for emitting light;
    an incident slit through which light emitted by said light source is passable;
    a diffraction grating for generating diffracted light from light which has passed through said incident slit;
    a diffracted light detector for detecting said diffracted light;
    at least one contact bar having a swinging end and a base portion, said contact bar being fixedly mounted to said diffraction grating at said base portion thereof;
    an eccentric disc cam slidably contacting said swinging end of said contact bar, said eccentric disc cam having a rotational axis, a distance being defined between said rotational axis and a point of contact between said eccentric disc cam and said swinging end of said contact bar; and
    a pulse motor for rotating said eccentric disc cam about said rotational axis:
    said eccentric disc cam being configured such that said distance between said rotational axis and said point of contact changes as said eccentric disc cam rotates.

2. A wavelength-scanning mechanism as set forth in claim 1 further comprising a cam follower mounted to said eccentric disc cam at a position eccentric to said rotational axis, said cam follower slidably contacting said swinging end of said contact bar.

3. A wavelength-scanning mechanism as set forth in claim 2 wherein:
    a plurality of said contact bars are fixedly mounted to said diffraction grating at different angular positions; and
    said cam follower is selectively movable between said swinging ends of said contact bars.

4. A wavelength-scanning mechanism as set forth in claim 1 further comprising a plurality of cam followers mounted to said eccentric disc cam at different positions eccentric to said rotational axis, said cam followers slidably contacting said swinging end of said contact bar alternatively.

5. A wavelength-scanning mechanism as set forth in claim 3 further comprising a plurality of cam followers mounted to said eccentric disc cam at different positions eccentric to said rotational axis, said cam followers slidably contacting said swinging end of said contact bar alternatively.

6. A wavelength-scanning mechanism as set forth in claim 1 wherein:
   said diffraction grating further generates specularly reflected light from light which has passed through said incident slit; and
   said wavelength-scanning mechanism further comprises a zero-order light detector for detecting said reflected light.

7. A wavelength-scanning mechanism as set forth in claim 6 further comprising:
   a first concave spherical mirror for reflecting light which has passed through said incident slit to said diffraction grating and for reflecting said reflected light to said zero-order light detector; and
   a second concave spherical mirror for reflecting said diffracted light to said diffracted light detector.

8. A wavelength-scanning mechanism as set forth in claim 6 further comprising:
   a zero-order light slit positioned between said diffraction grating and said zero-order light detector, said reflected light being passable through said zero-order light slit; and
   a diffracted light slit positioned between said diffraction grating and said diffracted light detector, said diffracted light being passable through said diffracted light slit.

9. A wavelength-scanning mechanism comprising:
   a light source for emitting light;
   an incident slit through which light emitted by said light source is passable;
   a first concave spherical mirror for reflecting light which has passed through said incident slit;
   a diffraction grating for generating diffracted light and specularly reflected light from light reflected by said first concave spherical mirror, said first concave spherical mirror further reflecting said reflected light;
   a second concave spherical mirror for reflecting said diffracted light;
   a diffracted light slit through which said diffracted light reflected by said second concave spherical mirror is passable;
   a diffracted light detector for detecting light which has passed through said diffracted light slit;
   a zero-order light slit through which said reflected light reflected by said first concave spherical mirror is passable;
   a zero-order light detector for detecting light which has passed through said zero-order light slit;
   at least one contact bar having a swinging end and a base portion, said contact bar being fixedly mounted to said diffraction grating at said base portion thereof;
   an eccentric disc cam slidable contacting said swinging end of said contact bar, said eccentric disc cam having a rotational axis, a distance being defined between said rotational axis and a point of contact between said eccentric disc cam and said swinging end of said contact bar:
   a pulse motor for rotating said eccentric disc cam; and
   a controller communicating with said diffracted and zero-order light detectors and with said pulse motor, said controller for driving said pulse motor and for processing information received from said light detectors;
   said eccentric disc cam being configured such that said distance between said rotational axis and said point of contact changes as said eccentric disc cam rotates.

10. A wavelength-scanning mechanism as set forth in claim 9 further comprising a cam follower mounted to said eccentric disc cam at a position eccentric to said rotational axis, said cam follower slidably contacting said swinging end of said contact bar.

11. A wavelength-scanning mechanism as set forth in claim 10 wherein:
    a plurality of said contact bars are mounted to said diffraction grating at different angular positions; and
    said cam follower is selectively movable between said swinging ends of said contact bars.

12. A wavelength-scanning mechanism as set forth in claim 9 further comprising a plurality of cam followers mounted to said eccentric disc cam at different positions eccentric to said rotational axis, said cam followers slidably contacting said swinging end of said contact bar alternatively.

13. A method for scanning wavelengths comprising the steps of:
    providing said wavelength-scanning mechanism of claim 9;
    determining a center value of a spectral range of said reflected light;
    positioning said diffraction grating at said center value;
    detecting said diffracted light;
    computing spectral intensity of said diffracted light; and
    repeating said positioning, detecting, and computing steps a desired number of times.

14. A method as set forth in claim 13 wherein said determining step further comprises the additional steps of:
    pivoting said diffraction grating until said reflected light is detected;
    pivoting said diffraction grating in increments until said reflected light is no longer detected;
    counting the number of increments between said pivoting steps to obtain said spectral range; and
    dividing the number of said counted increments by two to obtain said center value.

15. A method as set forth in claim 13 wherein said computing step further comprises the additional step of digitizing said diffracted light.

* * * * *